United States Patent
Huras et al.

[19]

[11] Patent Number: 6,125,401
[45] Date of Patent: *Sep. 26, 2000

[54] SERVER DETECTION OF CLIENT PROCESS TERMINATION

[75] Inventors: Matthew A. Huras, Ajax; Tim J. Vincent, Toronto, both of Canada

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/623,185

[22] Filed: Mar. 28, 1996

[30] Foreign Application Priority Data

Apr. 3, 1995 [CA] Canada ................................... 2146170

[51] Int. Cl.⁷ ............................ G06F 15/163; G06F 9/00; G06F 9/46
[52] U.S. Cl. ........................................... 709/300; 711/147
[58] Field of Search ............................. 395/726, 200.33, 395/200.44, 651

[56] References Cited

U.S. PATENT DOCUMENTS

| | | | |
|---|---|---|---|
| 5,313,638 | 5/1994 | Ogle et al. ................................ | 395/726 |
| 5,394,551 | 2/1995 | Holt et al. ................................ | 395/726 |
| 5,553,242 | 9/1996 | Russell et al. ...................... | 395/200.57 |
| 5,623,670 | 4/1997 | Bohannon et al. ..................... | 395/726 |
| 5,652,885 | 7/1997 | Reed et al. ................................ | 395/651 |

OTHER PUBLICATIONS

Richter, Jeffrey; "Synchronizing WIN32 threads using critical sections, semaphores, & nutexes"; Microsoft Systems Journal; v8 n8 p. 27(16) Aug. 1993.

Ruddell, Kevin; Using 05–2 semaphores to coordinate concurrent threads of execution; Microsoft Systems Journal, v3, n3, p. 19(8) May 1988.

Dixon, Brendan; "Creating a client server application with LAN Managers 2.0 & Named Pipes"; Microsoft Systems Journal, v6, n2 p. 93(14) Mar. 1991.

Stevens, W. Richard; UNIX Network Programming; Section 3.10, 3.11 1990.

Goldt, Sven et al, Linux Programmer's Guide, Section 6.4.3, Mar. 1995.

PARIX Man Page for Semaphores, PARIX release 1.2, Feb. 1993.

Bach, Maurice; The Design of the UNIX Operating System, pp. 355–381, 395–411, 1986.

Duncan, Ray; "Interprocess Communications in OS/2", Dr. Dobb's Journal, V14, N6, p. 14(7), 1989.

*Primary Examiner*—Majid A. Banankhah
*Assistant Examiner*—Pat Caldwell
*Attorney, Agent, or Firm*—Gates & Cooper

[57] ABSTRACT

A service provider for use in a client-server system which is capable of detecting the abnormal termination of a client process is disclosed. The service provider does not require a dedicated process for polling client processes in order to verify their status. Rather, a semaphore, which is used in conjunction with a shared memory segment for communication between a client process and the service provider, is initialized in such a manner that the operating system will automatically increment the semaphore in the event the client process is terminated. Thus, the semaphore will be incremented either when the client process deliberately increments the semaphore in order to notify the service provider that the client process has written data to a shared memory segment, or the semaphore will be incremented by the operating system in the event the client process terminates. A test flag is established in shared memory in order to differentiate whether the semaphore was incremented by the client process, or by the operating system. The client process will set the flag only when the client process increments the semaphore. Therefore, whenever the semaphore is incremented, the service provider will test the condition of the flag, and terminate resources allocated to the client process if the flag is not set.

29 Claims, 3 Drawing Sheets

SERVER DETECTION OF CLIENT PROCESS TERMINATION

FIELD OF THE INVENTION

The present invention relates to client-server systems generally, and in particular to client process termination detection by the service provider in a client-server system.

BACKGROUND OF THE INVENTION

In client-server systems, client processes are typically separate from the service provider, and require inter-process communication with the service provider. Once initiated, client processes typically occupy other system resources in addition to communication resources. For example, in a client-server system wherein the service provider is a Database Management System (DBMS), each client process occupies resources (eg, processes, threads, memory, locks on database data, etc.) in the DBMS. The cumulative resources occupied by clients can be significant, especially in systems which support hundreds, or even thousands of client application processes. It is therefore important for the service provider to deallocate these resources promptly after a client process terminates. Accordingly, client processes are usually designed to notify the service provider upon termination.

In situations where a client process terminates abnormally (for example, termination of the client process by the operating system due to an addressing violation), the service provider is not normally notified that the client has terminated. The client process can no longer notify the service provider because the client process has been terminated. Furthermore, although the operating system is often aware of the termination, since usually the operating system is responsible for the termination, the operating system does not normally notify the service provider that the client process has terminated. The service provider, therefore, must be able to detect the abnormal termination of a client process in order to deallocate the system resources previously allocated to the terminated client. The mechanism for detecting abnormal client termination depends on the inter-process communication mechanism utilized by the system.

In some systems, this communication is facilitated by means of a communication protocol (eg., TCPIP, SNA, NETBIOS). Typically in systems using one of these communication protocols, a polling mechanism is used by the service provider to verify the continued existence of each client at regular intervals. There are two primary disadvantages associated with such polling mechanisms. First, performance of the system is affected because CPU time is required to conduct the polling. Furthermore, such CPU time is used even if no client process abnormally terminates. Second, resources allocated to a terminated client process are not deallocated promptly after termination, but remain allocated until that client is next polled.

Another mechanism for enabling communication between client and server processes involves the utilization of shared memory. In such a system, the client process and the server process communicate by reading and writing to shared memory segments accessible by both. When shared memory is used, operating system mechanisms called semaphores are typically used for controlling client and server access to the shared memory segments by notifying one process when the other process has written data to a shared memory segment. For example, as a client process writes to shared memory, the client process will post (increment) a semaphore, which will in turn notify a waiting process (in this example, the server process) that data is waiting for it in shared memory. The waiting process will then read the data, completing the data transfer.

Semaphores can be used for a variety of purposes, and are more than just simple boolean flags. In particular, a semaphore has associated with it a non-negative integer value, and several types of operations can be performed on a semaphore. For example, operating systems which are UNIX System V Release 4 compliant have the capability of automatically adjusting the value of the semaphore, by "undoing" an operation which was previously performed on the semaphore by a process using the SEM_UNDO flag, when that process terminates. For example, if a semaphore was initialized with the SEM_UNDO flag and a decrement operation, the operating system will increment the semaphore (ie, undo the decrement operation), when that process terminates.

These features are often used in situations where a series of processes are competing for a particular resource, and the resource can only support a limited number of processes. In these situations, semaphores can be used for controlling access to the resource, with the initial value of the semaphore set at the maximum number of process which the resource can support. Each process attempting to obtain access to the resource will execute an operation to decrease the value of the semaphore by one. If this operation is possible without reducing the value of the semaphore below zero, the process will gain access to the resource, otherwise the process will wait in a queue. The next process in the queue will obtain access to the resource when the semaphore's value is incremented. When the process currently using a resource terminates, the operating system will automatically increment the semaphore's value, thus allowing the next waiting process to have access to that resource.

In systems using shared memory and semaphores as the inter-process communication mechanism between client and server processes, polling mechanisms are typically used for detecting the abnormal termination of a client process. In such a system, a dedicated service provider process polls all client processes at regular intervals. In this manner, the service provider is able to verify the continued existence of its clients. This mechanism suffers from the same disadvantages as the polling mechanisms for the communication protocols discussed above.

A termination detection system which more promptly frees system resources once a client terminates, while using less system resources itself, would be beneficial.

SUMMARY OF THE INVENTION

The present invention provides a means and a method for a service provider in a client-server system to detect the abnormal termination of a client process, without requiring a dedicated polling mechanism. The invention pertains to client-server systems in an operating system environment which uses shared memory and semaphores in order to carry out interprocess communication between client processes and associated server processes.

A broad aspect of the invention provides:

in a computer system having a service provider communicating with a plurality of client processes and an operating system which supports communication between each client process and the service provider by means of shared memory and semaphores, an improved method of detecting the termination of a client process by the service provider without requiring periodic polling of the client processes, said method comprising the steps of:

establishing a semaphore associated with said client process in such a manner that the operating system will increment said semaphore in the event said client process terminates;

setting a flag associated with a client process whenever said client process increments said semaphore;

testing said flag by said service provider whenever said semaphore is incremented in order to determine whether said flag was set by said client process.

Another aspect of the invention provides for a service provider for a client server system running under an operating system of the type capable of supporting a plurality of client processes and utilizing shared memory segments and semaphores for interprocess communication between processes, said service provider being capable of detecting the abnormal termination of a client process without polling, said service provider comprising:

means for establishing a flag associated with said client process;

means for establishing a semaphore associated with said client process in such a manner that the operating system will automatically post the semaphore when said client process terminates;

server detection means for testing the condition of said flag whenever said semaphore is posted; and flag resetting means for resetting said flag, said flag resetting means responsive to said server detection means.

Yet another aspect of the invention provides for a computer program product for use on a computer system capable of supporting a plurality of processes and capable of using shared memory segments and semaphores as a mechanism for allowing interprocess communication between processes running said computer system, said computer program product comprising:

means for establishing a server process running on said computer system for providing a service to a client process running on said computer system;

means for establishing a semaphore associated with said client process;

server library means for managing the interprocess communication for said client process, said server library means including means for initializing said semaphore in such a manner that the operating system will automatically increment the semaphore when said client process terminates;

means for establishing a flag associated with said client process;

server detection means for testing the condition of said flag whenever said semaphore is posted; and flag resetting means for resetting said flag, said flag resetting means responsive to said server detection means.

Still another aspect of the invention provides a computer program product for use with a computer system having an operating system capable of using shared memory segments for data transfer between processes running on said computer system and semaphores for coordinating access to said shared memory segments by said processes, wherein said operating system is capable of incrementing a semaphore associated with a process in the event said process terminates, said computer program product comprising:

a recording medium;

means recorded on said recording medium for establishing a service provider program on said computer system which is capable of detecting the abnormal termination of a client process running on said computer system without having to periodically poll said client process; said service provider being capable of:

a) establishing a flag associated with each client process;

b) establishing a semaphore associated with each client process;

c) instructing said client process to set said flag whenever said client process increments said semaphore; and d) testing said flag wherever said semaphore is incremented in order to determine whether said flag was set by its associated client process.

These foregoing aspects of the invention, together with other aspects and advantages thereof will be more apparent from the following description of the preferred embodiments thereof, taken in conjunction with the following drawings.

DETAILED DESCRIPTION OF THE PREFERRED EMBODIMENT

The present invention is applicable to service providers in general. For ease of discussion, the general implementation of the present invention will be discussed with respect to a particular example of a service provider, namely a DataBase Management System (DBMS). In particular, the features of the preferred embodiment of the invention will be discussed with respect to its implementation for operating systems which are UNIX System V Release 4 compliant.

Figure 1:
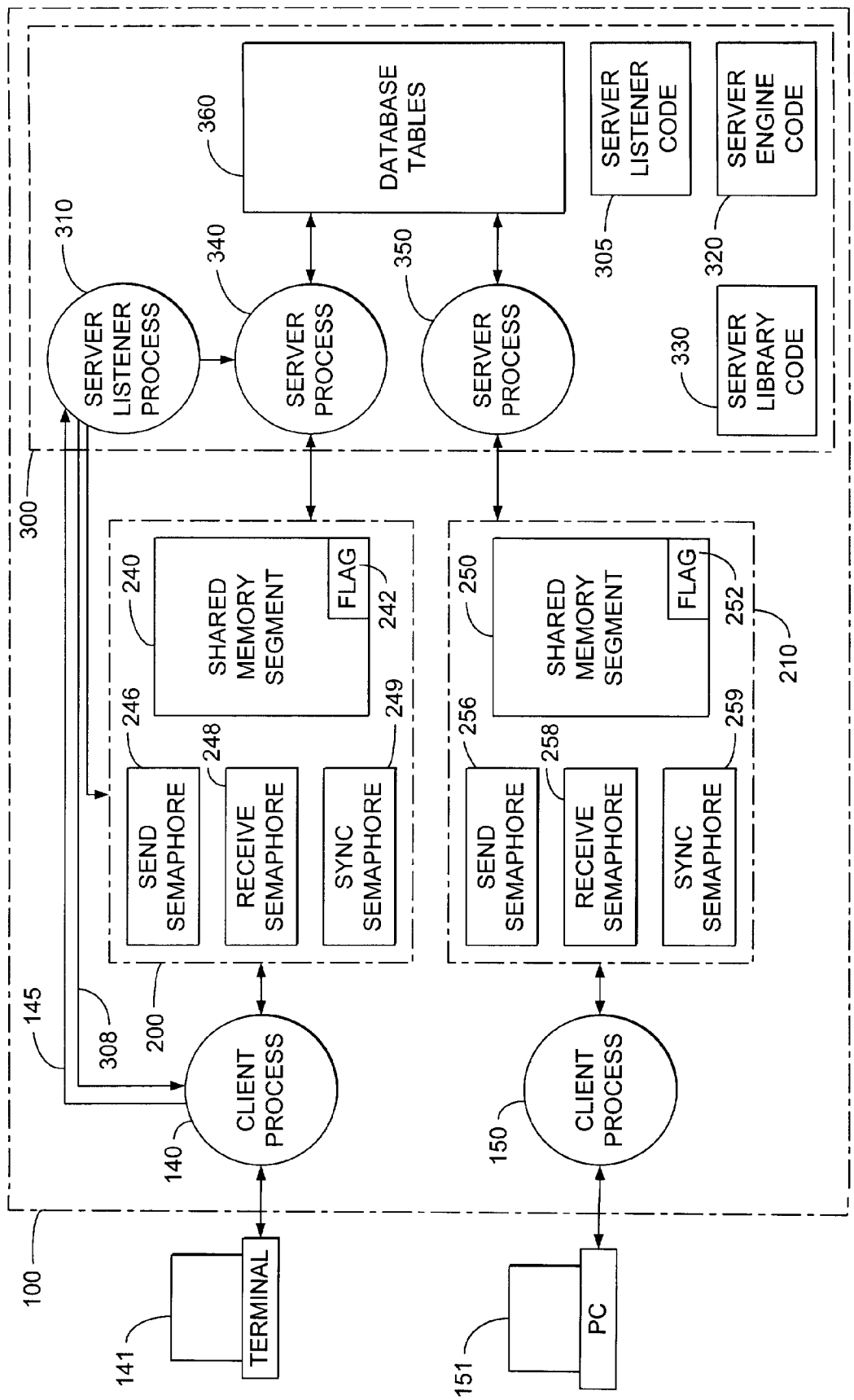
FIG. 1 is a schematic block diagram illustrating the components of a client-server system incorporating the preferred embodiment of the present invention.

The preferred embodiment of the present invention will now be described with reference to FIG. 1. Box 100 represents a single machine computer system, for example a mainframe computer system, which includes a CPU, memory, disc storage, etc. This figure illustrates schematically in block diagram form the components of a client-server system incorporating the preferred embodiment of the present invention. The figure also illustrates the interaction of these components for allowing inter-process communication between client processes and server processes running on the computer system. The left hand portion of FIG. 1 shows a terminal 141, and a personal computer 151, each connected to the computer system and communicating with client process 140 and client process 150 respectively, with each client process running on the main computer system. For ease of illustration, FIG. 1 only illustrates two client processes, although many more would be running concurrently in a typical client-server system. The middle portion of the figure illustrates the operating system inter-process communication resources established by the service provider for enabling data transfer between client and server processes. These resources, which are all labelled with numbers between 200 and 299, include a shared memory segment, and a set of semaphores for each client process. The right hand portion generally illustrates the service provider components within box 300, with each component labelled with numbers between 300 and 399.

Server listener code 305 represents a portion of the service provider which establishes a server listener process 310, which in turn manages each initial client-server interface. As part of the start up of the service provider, the server listener process 310 establishes two known inter-process communication resources, namely a Listener Response Queue (a queue for receiving initial messages from client processes) and a Listener Response Queue (a queue for responding to the initial messages from client processes), in order to facilitate initial communication between each new client process and the service provider.

When a user operating a terminal 141 runs an application which is designed to interact with a service provider incorporating the present invention, the application program establishes the client process 140 running on the computer system 100. The application calls the server library code 330, which is supplied as part of the service provider system. Server Library code 330 includes routines for controlling the client process communication with the service provider. A service provider can be upgraded to incorporate the preferred embodiment of the present invention without requiring any changes to the client application program, simply by upgrading the server library code 330, which will still be called by the application program as long as the name of the server library code 330 remains the same.

Upon loading the server library code 330, the client process 140 will send a message 145 to the Server listener process 310 by means of the Listener Response Queue, in a known manner. This message notifies the server listener process 310 that a new client process has been established.

The server listener process 310 then allocates inter-process communication resources to the client process 140. These resources are shown generally within box 200. The server listener process establishes a shared memory segment 240 which will be associated with client process 140. Server listener process 310 also establishes flag 242 (which we will refer to as the "valid request flag"), preferably within shared memory segment 240. Server listener process 310 also establishes a set of semaphores for controlling and synchronizing access to the shared memory segment 240.

Send semaphore 246 is established, as for example by using the UNIX semaphore semget( ) function. In the preferred embodiment of the present invention, each semaphore is used for controlling communication in one direction between a client process and a server process associated with it. Thus semaphore 246 is labelled as a "Send" semaphore because it is normally used to identify when the client process 140 has written data to the shared memory segment 240. The server listener process 310 also establishes a receive semaphore 248, which notifies the client process 140 when the service provider has written the response data to the shared memory segment 240, and also the sync semaphore 249, which is used in order to initially synchronize a client process with its associated server process.

In the preferred embodiment shown, flag 242 is boolean in nature, and can take on a value of true (ie, a value of one), or false (ie, a value of zero). For convenience a value of true will be referred to as valid request, while a value of false will be referred to as an invalid request (because, as will be made more apparent later, a value of false will indicate that the send semaphore has been posted even though the client process has not written a valid request to the shared memory, implying the semaphore was posted by the operating system as a result of the client process terminating). Flag 242 is initially set with a value of false.

The server listener process 310 then establishes a server process 340, according to the server engine code 320, for providing service to client process 140. The Server Listener Process informs the server process 340 of the identification information for the semaphores and shared memory segment associated with client process 140. In the preferred embodiment shown, the service provider establishes a dedicated server process for each client process. This is not a requirement for the present invention, which could operate with a plurality of client processes each serviced by a single server process. In such a system, any server process which served more than one client process would still communicate with each client process via a shared memory segment and a semaphore set associated with that client process.

The server listener process 310 then sends the identification information for the semaphores and shared memory segment to the client process 140 (in a known manner by means of the listener response queue) as indicated by arrow 308.

A similar initialization process takes place for each new client process. For example, client process 150 can be started by an application program, which could be the same application program which established client process 140, or a different application. For example, one application can be a financial data application whereas the other application can be a human resources application, wherein each accesses data from the same DBMS service provider. Upon initialization client process 150 loads the server library code 330 and carries out the same steps as described above for client process 140, in order to establish send semaphore 256, receive semaphore 258, sync semaphore 259, and shared memory segment 250 (including valid request flag 252, which is initially set with a value of false), for communication with server process 350.

In the preferred embodiment shown, each semaphore is utilized for controlling one way communication between two processes. Therefore, each semaphore will take on one of two values: one (posted), or zero ("not posted"). The value of each semaphore is initially set to zero (ie, not posted). The preferred embodiment described utilizes the following properties of UNIX System V Release 4 semaphores: i) the value of a semaphore must be a non-negative integer; and ii) any semop ( ) function which attempts to reduce the value of a semaphore below zero blocks (puts to sleep) the calling process until the semop ( ) function can operate without reducing the value below zero. Therefore a wait function, of the form semop(semoparray="-1", nops= 1), executed on a "not posted" semaphore, forces the calling process to wait until the semaphore's value is incremented (ie, until some other process issues a semop ( ) function to increment the semaphore value) before the process can proceed.

Figure 2A:
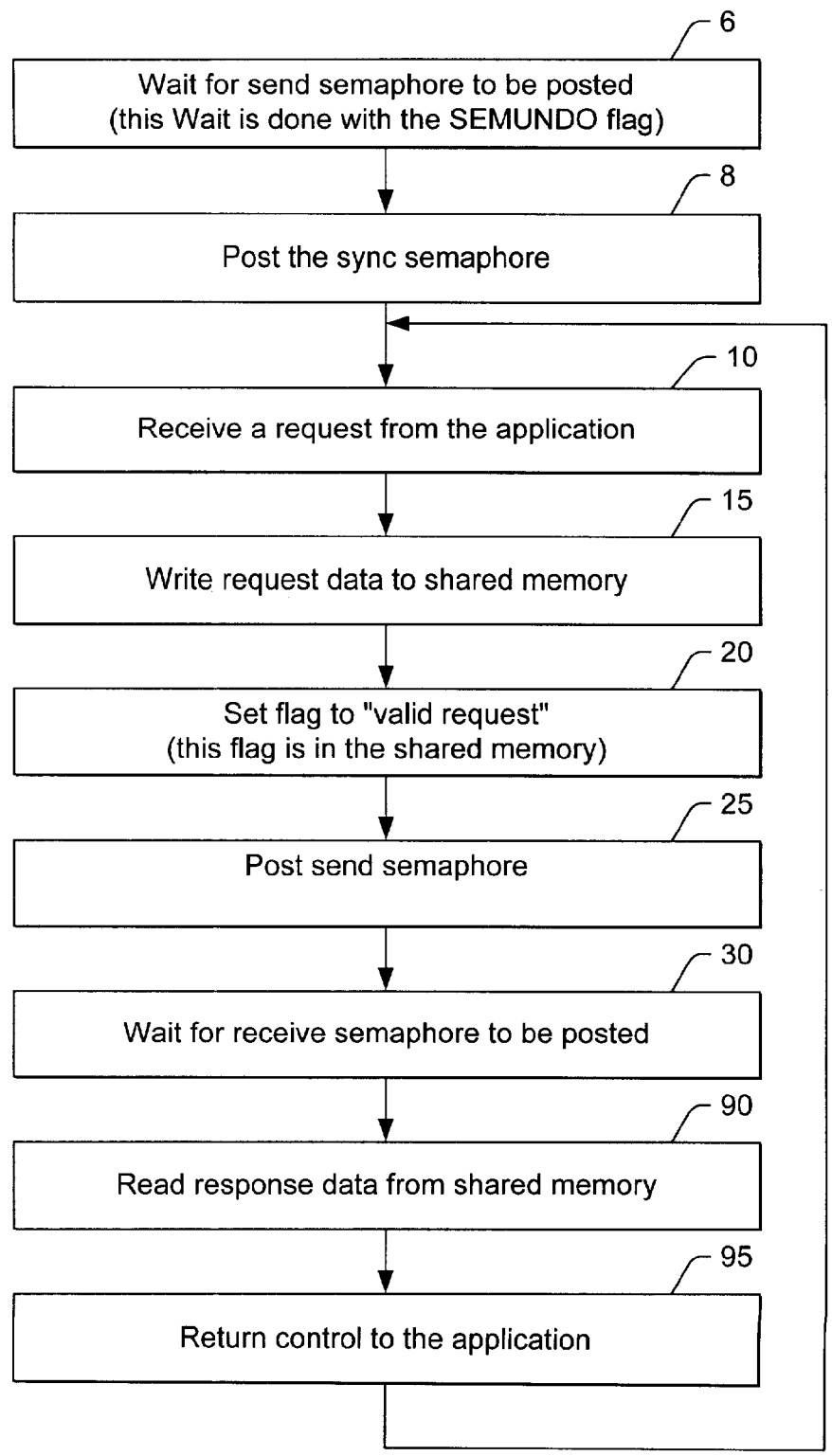
FIG. 2 is a flow chart illustrating the steps taken by both a client process (FIG. 2a), and its corresponding server process (FIG. 2b), according to the preferred embodiment of the invention.

The operation of the preferred embodiment of the invention, will now be discussed with continued reference to FIG. 1, and also with reference to FIGS. 2a and 2b. FIG. 2a illustrates the steps taken by client process 150, and FIG. 2b illustrates the steps taken by the server process 350, after the processes have been established.

Figure 2B:
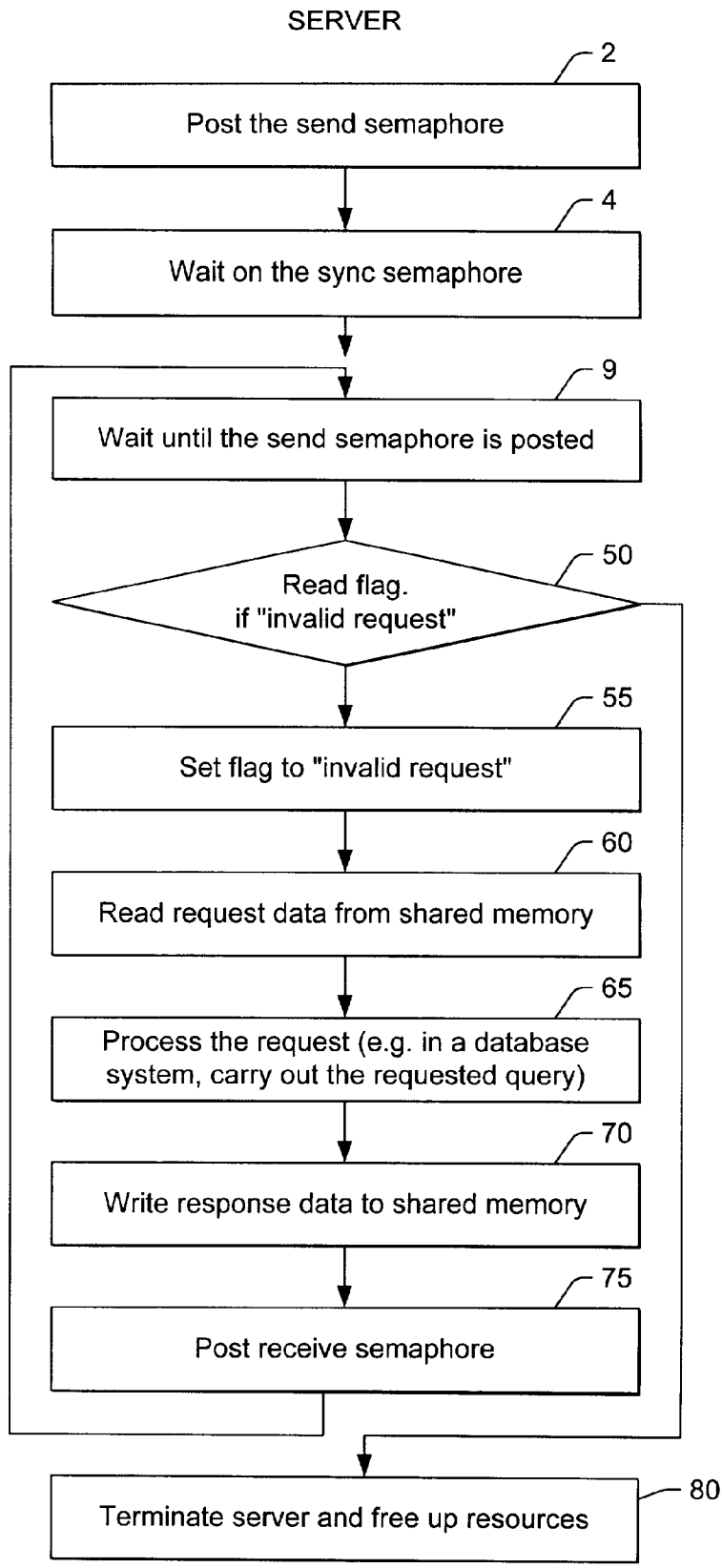

Boxes 2, 4, 6, and 8, as shown in FIGS. 2a and 2b, illustrate how the send semaphore is initialized with the SEM_UNDO flag, and how the client and server processes are synchronized. After the server process 350 has been established, it executes a post (ie, increment) operation on the send semaphore 256, as shown at box 2. After the client process 150 receives the identification information from the Server Listener Process 310, the client process 150 executes a Wait function (ie, a semop( ) function with "-1" as the operator) with the SEM_UNDO flag set on the send Semaphore 256, as shown at box 6. This operation serves two purposes. First, regardless of which of these two steps (box 2 or box 6) is executed first, it ensures that the client process will not proceed to the step indicated by box 8 until after the server process has completed the step indicated at box 2, since the send semaphore is initially set with a value of zero. Second, the client process has now initialized the send semaphore with the SEM_UNDO flag. Therefore, when the client process subsequently terminates (either normally or abnormally), the operating system will automatically "undo" the "−1" operation carried out as part of the step shown at box 6, by incrementing (ie, posting) the semaphore 256. The client process then posts the sync semaphore 259, as shown at box 8, ending its initializing procedure before proceeding to the step shown at box 10.

Meanwhile, as shown at box 4, the server process 350 waits for the client process 150 to post the sync semaphore 259 (step 8), by executing a wait function on the sync semaphore 259, before proceeding to step 9. Thus, the sync semaphore 259 is used to ensure that the send semaphore 256 is initialized with the SEM_UNDO flag before the server process attempts to execute a wait function on it, regardless of which process first gains access to the CPU.

After initialization, the server process 350 waits for input from the client process 150. This input can be in the form of commands, data or a combination thereof. Thus, upon initialization, server process 350 executes a wait function, by using, for example, the semop(semoparray="−1", nops=1) function on send semaphore 256, as illustrated by step 9 in FIG. 2. This attempts to decrease the value of the semaphore below zero, which can not happen until semaphore 256 is posted by some other process, because the semaphore's state after the initialization process of steps 2–8 is "not posted". Therefore, the server process 350 waits until semaphore 256 is posted by either client process 150 (box 25), or by the operating system as a result of client process 150 terminating.

Meanwhile, referring to the step illustrated at box 10 of FIG. 2b, after initialization, the client process 150 waits until it receives a request from the client application. Client process 150 then writes the request data and/or instructions to the shared memory segment 250, as shown at 15. Client process 150 then sets the valid request flag 252 to true, as shown at 20. The client process 150 then executes a post function to increment the value of the send semaphore 256, by using, for example, the semop (semoparray="+1", nops=1) function, as shown at 25. This post function will switch the state of the send semaphore 256 from its current state of "not posted" to posted, by incrementing the value of the semaphore from zero to one. Client process 150 then waits for the server process to read the request data from the shared memory segment and write a response. In other words, as shown at 30, client process 150 executes a wait function on the receive semaphore 258 (which will attempt to decrease the value of the semaphore from its initial value of zero), making client process 150 wait until the receive semaphore 258 is posted by server process 350 (step 75).

Referring now to FIG. 2b, once send semaphore 256 is posted as a result of step 25, the wait function executed at step 9 will be able to carry out its semop ( ) operation, switching the newly posted semaphore back to a state of not posted and ending the wait function. As shown at 50, Server process 350 then reads flag 252 in order to test whether the flag has been set as a valid request (ie. whether it has been set true) by client process 150 at step 20. Test 50 is executed in order to determine whether the send semaphore 256 was posted by client process 150, which will indicate that client process 150 has written data to shared memory segment 250, or whether send semaphore 256 was posted by the operating system, indicating the termination of client process 150.

In order for the result of test 50 to be positive, flag 252 must be set as an invalid request (ie. the flag value is false). This indicates that the send semaphore 256 has been posted by the operating system due to the termination of client process 150, and the Server Process 350 will therefore execute the terminate server routine, as shown at 80, in order to free up system resources.

For the result of test 50 to be negative, flag 252 must have been set as a valid request (ie, to a value of true) by the client process 150 at step 20. This implies that client process 150, and not the operating system, was responsible for posting the send semaphore 256. If the result of test 50 is negative, then server process 350 proceeds to step 55, resetting flag 252 to invalid request (ie. setting it to false). In this manner, flag 252 is reinitialized, so that the next time send semaphore 256 is posted, flag 252 may be tested in order to determine whether the subsequent posting was due to client process 150 writing additional data to shared memory segment 250, or whether client process 150 has been terminated.

After server process 350 has reset flag 252, server process 350 reads the request data from the shared memory segment 250, as indicated at 60. Server process 350 then processes the request, for example, by carrying out a requested query on the data base tables 360, as shown at 65, and then writes the response data to the shared memory segment 250 as indicated at step 70. Server process 350 then posts the receive semaphore 258 in order to notify client process 150 that there is data waiting for it in shared memory segment 250, as shown at 75. Server process 350 then re-executes the wait function 9 on send semaphore 256, as shown by arrow 77. Assuming Client process 150 has not terminated, this wait function will attempt to reduce the value of send semaphore below zero, thus putting server process 350 into a waiting state until the send semaphore 256 is again posted. If Client process 350 has terminated since the last wait function 9 ended, the operating system would have posted semaphore 256 (as a result of the semaphore being initialized with the SEM_UNDO flag), thus incrementing the semaphore's value from a value of zero to a value of one. Thus the value of the semaphore will not be reduced below zero as a result of the re-execution of the wait function (the semop( ) function only puts the calling process to sleep if the function attempts to reduce the semaphore value below 0), so the server process will immediately proceed to test 50. This test will necessarily be positive, because the flag 252 was set as an invalid request during step 55. Consequently the server process will proceed to step 80, and terminate the resources allocated to client process 350.

Assuming client process 150 has not terminated, once receive semaphore 258 has been posted by server process 350, then client process 150 will read the response data from the shared memory segment 250 as indicated at 90. Having received the data from the data base engine, client process 150 will then return the data and control to the application as indicated at 95. The client process will then wait until it receives another request from the application.

If the client process is terminated, either because the application has completed its processing, or because the operating system terminated the client process for some reason, the operating system will post the send semaphore. In this case, the valid request flag will not have been set to true by the client process. After the posting of the send semaphore, the server process will test the flag as discussed and terminate all resources allocated to the client process 150.

In an alternative embodiment, flag 252 could be an integer flag rather than a boolean flag. Step 20 is changed so that the client process increments the value of flag 252 every time the client process writes to the shared memory segment. In this case, the test step 50 determines whether the flag has been incremented since the last test (if any) was executed. To facilitate this test, a counter, which is initially set to zero, is established for storing the value of flag 252 after each test step 50. In other words, step 55 in this alternative embodiment increments the counter (ie, sets the counter to the current value of the flag 252), every time a test step 50 is executed while the client process is still active. Test 50 then determines whether the flag 252 is equal to the current value of the counter. If the values are equal, this implies the semaphore was posted by the operating system (otherwise the client process would have incremented the value of the flag at step 20, so that the flag's value is no longer equal to its value during the last test), so the system would proceed to step 80. In other words, rather than resetting a boolean flag, step 55 effectively resets a test condition for any subsequent test.

As stated, the UNIX System V Release 4 operating system has the capability of automatically incrementing the value of a semaphore when a process, which previously decremented the semaphore with the SEM_UNDO flag specified, terminates. The UNIX operating system also has the capability to block (put to sleep) any process which attempts to reduce the value of a semaphore, if such a reduction would make the semaphore's value negative, until the reduction can take place without reducing the value of semaphore below zero. The present invention can be implemented for other operating systems which provide (or are upgraded to provide) equivalent features.

It will be apparent that many other changes may be made to the illustrative embodiments, while falling within the scope of the invention and it is intended that all such changes be covered by the claims appended hereto.

What is claimed is:

1. In a computer system having a service provider communicating with a plurality of client processes and an operating system which supports communication between each client process and the service provider by means of shared memory and semaphores, an improved method of detecting the normal or abnormal termination of a client process by the service provider without requiring periodic polling of the client processes, said method comprising the steps of:

establishing a semaphore associated with said client process in such a manner that the operating system performs a specified operation on said semaphore in the event said client process terminates;

setting a flag associated with the semaphore, the flag being set whenever said client process performs the specified operation on said semaphore, and the flag identifying the client process as the entity which performed said specified operation on said semaphore;

testing said flag by said service provider whenever the specified operation is performed on said semaphore in order to determine whether the specified operation was performed by said client process rather than the operating system, wherein performance of the specified operation on the semaphore by the client process is indicative of normal termination of the client process and performance of the specified operation on the semaphore by the operating system is indicative of abnormal termination of the client process.

2. A method for detecting the abnormal termination of a client process by a service provider in a client-server system having an operating system capable of supporting a plurality of client processes and utilizing shared memory segments and semaphores for interprocess communication between processes, said operating system of the type capable of performing a specified operation on a semaphore automatically upon the termination of a process associated with said semaphore, said method comprising the steps of:

a) establishing a semaphore associated with each client process in such a manner that the operating system performs the specified operation on said semaphore;

b) establishing a flag associated with each semaphore;

c) setting said flag whenever said flag's associated client process performs the specified operation on said semaphore; and d) testing said flag whenever the specified operation is performed on said semaphore in order to determine whether the specified operation was performed by the associated client process rather than the operating system, wherein performance of the specified operation on the semaphore by the client process is indicative of normal termination of the client process and performance of the specified operation on the semaphore by the operating system is indicative of abnormal termination of the client process.

3. The method as claimed in claim 2 further comprising the step of resetting said flag if step (d) determines said flag has been set.

4. The method as claimed in claim 2 further comprising the steps of resetting said flag if step (d) determines said flag has been set; and deallocating resources allocated to said client process if said flag has not been set.

5. In a client-server system having an operating system capable of supporting a plurality of client processes and utilizing shared memory segments and semaphores for interprocess communication between processes, said operating system being capable of automatically performing a specified operation on a semaphore upon the termination of a process associated with said semaphore, a method for deallocating resources allocated to a client process which has terminated normally without requiring the service provider to poll client processes in order to determine whether a client process has terminated normally or abnormally comprising the steps of:

a) initializing each client process in such a manner that:
      a shared memory segment is allocated to said client process, and
      a semaphore, for identifying when said client process has written to said shared memory segment, is allocated to said client process;
      wherein said semaphore is initialized in such a manner that the operating system will automatically perform the specified operation on said semaphore upon the termination of the client process, and
      wherein said shared memory segment includes a flag associated with the semaphore;

b) setting said flag whenever said client process writes to said shared memory segment;

c) performing the specified operation on said semaphore whenever said client process writes to said shared memory segment;

d) testing said flag by said service provider whenever the specified operation is performed on said semaphore in order to determine whether the specified operation was performed by said client process rather than the operating system, wherein performance of the specified operation on the semaphore by the client process is indicative of normal termination of the client process and performance of the specified operation on the semaphore by the operating stem is indicative of abnormal termination of the client process;

e) terminating all resources allocated to said client process whenever said flag has not been set when said service provider tests said flag; and f) resetting said flag whenever said flag has been set when said service provider tests said flag.

6. The method as claimed in claim 5 wherein said initializing step further comprises the steps of:

allocating a server process for providing service to the client process; and putting said server process into a waiting state until the specified operation is performed on said semaphore by either said client process or said operating system.

7. The method as claimed in claim 6 further comprising the following steps carried out by said service provider whenever said flag has been set when said service provider tests said flag:

reading said shared memory segment by said service provider for processing after said processing, writing response data to said shared memory segment;

notifying said client process that data is waiting in said shared memory segment; and resuming said waiting state until the specified operation is again performed on said semaphore by either said client process or said operating system.

8. A service provider for a client server system running under an operating system of the type capable of supporting a plurality of client processes and utilizing shared memory segments and semaphores for interprocess communication between processes, said service provider being capable of detecting the normal or abnormal termination of a client process without polling, said service provider comprising:

means for establishing a semaphore associated with said client process in such a manner that the operating system will automatically perform a specified operation on the semaphore when said client process terminates;

means for establishing a flag associated with said semaphore, the flag being set whenever said client process performs the specified operation on the semaphore;

server detection means for testing the condition of said flag whenever the specified operation is performed on said semaphore in order to determine whether the specified operation was performed by said client process rather than the operating system, wherein performance of the specified operation on the semaphore by the client process is indicative of normal termination of the client process and performance of the specified operation on the semaphore by the operating system is indicative of abnormal termination of the client process; and flag resetting means for resetting said flag, said flag resetting means responsive to said server detection means.

9. The service provider as claimed in claim 8 further comprising:

means for causing said client process to:
i) set the condition of said flag, and
ii) perform the specified operation on said semaphore associated with said client process,
whenever said client process writes to a shared memory segment.

10. The service provider as claimed in claim 9 further comprising termination means for deallocating resources allocated to said client process, said termination means responsive to said server detection means.

11. A computer program product for use on a computer system capable of supporting a plurality of processes and capable of using shared memory segments and semaphores as a mechanism for allowing interprocess communication between processes running on said computer system, said computer program product comprising:

means for establishing a server process running on said computer system for providing a service to a client process running on said computer system;

means for establishing a semaphore associated with said client process;

server library means for managing the interprocess communication for said client process, said server library means including means for initializing said semaphore in such a manner that the operating system will automatically perform a specified operation on the semaphore when said client process terminates;

means for establishing a flag associated with said semaphore, the flag being set whenever said client process performs the specified operation on the semaphore;

server detection means for testing the condition of said flag whenever the specified operation is performed on said semaphore in order to determine whether the specified operation was performed by said client process rather than the operating system, wherein performance of the specified operation on the semaphore by the client process is indicative of normal termination of the client process and performance of the specified operation on the semaphore by the operating system is indicative of abnormal termination of the client process; and flag resetting means for resetting said flag, said flag resetting means responsive to said server detection means.

12. The computer program product as claimed in claim 11 further comprising:

means for establishing a shared memory segment associated with said client process; and wherein said server library means further comprises means for causing said client process to
i) set the condition of said flag, and
ii) perform the specified operation on said semaphore associated with said client process,
whenever said client process writes to a shared memory segment.

13. The computer program product as claimed in claim 12 further comprising:

terminating means for terminating resources allocated to said client process; said terminating means responsive to said server detection means.

14. A computer program product for use on a computer system capable of supporting a plurality of processes and capable of using shared memory segments and semaphores as a mechanism for allowing interprocess communication between processes running on said computer system, said computer program product comprising:

means for establishing a server process running on said computer system for providing a service to a client process running on said computer system;

means for establishing a semaphore associated with said client process;

server library means for managing the interprocess communication for said client process, said server library means including means for initializing said semaphore in such a manner that the operating system will automatically perform a specified operation on the semaphore when said client process terminates;

means for establishing a flag associated with the semaphore, the flag being set whenever said client process performs the specified operation on the semaphore;

server detection means for testing the condition of said flag whenever the specified operation is performed on said semaphore in order to determine whether the specified operation was performed by said client process rather than the operating system, wherein performance of the specified operation on the semaphore by the client process is indicative of normal termination of the client process and performance of the specified operation on the semaphore by the operating system is indicative of abnormal termination of the client process; and resetting means for resetting a test condition associated with said flag, said flag resetting means responsive to said server detection means.

15. A computer program product for use with a computer system having an operating system capable of using shared memory segments for data transfer between processes running on said computer system and semaphores for coordinating access to said shared memory segments by said processes, wherein said operating system is capable of performing a specified operation on a semaphore associated with a process in the event said process terminates, said computer program product comprising:

a recording medium;

means recorded on said recording medium for establishing a service provider program on said computer system which is capable of detecting the normal or abnormal termination of a client process running on said computer system without having to periodically poll said client process; said service provider being capable of:

a) establishing a semaphore associated with each client process, wherein the operating system performs a specified operation on said semaphore associated with said client process when said client process terminates;

b) establishing a flag associated with the semaphore;

c) instructing said client process to set said flag whenever said client process performs the specified operation on said semaphore; and d) testing said flag whenever the specified operation is performed on said semaphore in order to determine whether said flag was set by its associated client process in order to determine whether the specified operation was performed by said client process rather than the operating system, wherein performance of the specified operation on the semaphore by the client process is indicative of normal termination of the client process and performance of the specified operation on the semaphore by the operating system is indicative of abnormal termination of the client process.

16. A computer program product for use with a computer system having an operating system capable of using shared memory segments for data transfer between processes running on said computer system and semaphores for coordinating access to said shared memory segments by said processes, wherein said operating system is capable of performing a specified operation on a semaphore associated with a process in the event said process terminates, said computer program product comprising:

a recording medium;

means recorded on said recording medium for establishing a service provider program on said computer system which is capable of detecting the normal or abnormal termination of a client process running on said computer system without having to periodically poll said client process; said service provider being capable of:

a) establishing a semaphore associated with each client process, wherein the operating system performs a specified operation on said semaphore associated with said client process when said client process terminates;

b) establishing a flag associated with the semaphore;

c) instructing said client process to set said flag whenever said client process performs the specified operation on said semaphore;

d) testing said flag whenever the specified operation is performed on said semaphore in order to determine whether the specified operation was performed by said client process rather than the operating system, wherein performance of the specified operation on the semaphore by the client process is indicative of normal termination of the client process and performance of the specified operation on the semaphore by the operating system is indicative of abnormal termination of the client process;

e) resetting said test condition if said computer system determines in step (d) that said flag has been set; and f) deallocating resources allocated to said client process if said computer system determines in step (d) that said flag has not been set.

17. A computer program product for use with a service provider running on a computer system having an operating system capable of using shared memory segments for data transfer between processes running on said computer system and semaphores for coordinating access to said shared memory segments by said processes, wherein said operating system is capable of performing a specified operation on a semaphore associated with a process in the event said process terminates, said computer program product comprising:

a recording medium;

means recorded on said recording medium for establishing, on said computer system, a series of program code routines for controlling said data transfer and for detecting the normal or abnormal termination of a client processing on said computer system without having to periodically poll said client process; said series of program code routines comprising:

a) means for establishing a semaphore associated with each client process, wherein the operating system performs a specified operation on said semaphore associated with said client process when said client process terminates;

b) means for establishing a flag associated with the semaphore;

c) means for instructing said client process to set said flag whenever said client process performs the specified operation on said semaphore;

d) means for testing said flag whenever the specified operation is performed on said semaphore in order to determine whether the specified operation was performed by said client process rather than the operating system, wherein performance of the specified operation on the semaphore by the client process is indicative of normal termination of the client process and performance of the specified operation on the semaphore by the operating system is indicative of abnormal termination of the client process;

e) means for resetting said test condition if said computer system determines in step (d) that said flag has been set; and f) means for deallocating resources allocated to said client process if said computer system determines in step (d) that said flag has not been set.

18. A computer program product for use with a service provider running on a computer system having an operating system capable of using shared memory segments for data transfer between processes running on said computer system and semaphores for coordinating access to said shared memory segments by said processes, wherein said operating system is capable of performing a specified operation on a semaphore associated with a process in the event said process terminates, said computer program product comprising:

a recording medium;

means recorded on said recording medium for establishing, on said computer system, server engine code for establishing a server process, associated with a client process running on said computer system, for providing a service to said client process;

means recorded on said recording medium for establishing, on said computer system, server library code for controlling client process data transfer, said server library code adapted to be loaded by each client process running on said computer system; and means recorded on said recording medium for establishing, on said computer system, server listener code for establishing interprocess communication resources associated with a client process for facilitating data transfer between said server process and said client process; wherein said server listener code comprises means for establishing a semaphore associated with each client process, and means for establishing a flag associated with each semaphore, wherein the operating system performs a specified operation on said semaphore associated with said client process when said client process terminates;

and wherein said server library code comprises means for instructing said client process to set said flag whenever said client process performs the specified operation on said semaphore;

and wherein said server engine code comprises means for instructing said server process to carry out the following steps whenever the specified operation is performed on said semaphore:

i) test said flag in order to determine whether the specified operation was performed by said client process rather than the operating system, wherein performance of the specified operation on the semaphore by the client process is indicative of normal termination of the client process and performance of the specified operation on the semaphore by the operating system is indicative of abnormal termination of the client process;

ii) reset said test condition if said server process determines in step (i) that said flag has been set; and ii) deallocate resources allocated to said client process if said computer system determines in step (i) that said flag has not been set.

19. A computer program product for use on a computer system capable of supporting a plurality of processes and capable of using shared memory segments and semaphores as a mechanism for allowing interprocess communication between processes running on said computer system, said computer program product comprising:

a recording medium;

means recorded on said recording medium for establishing on said computer system a server process running on said computer system for providing a service to a client process running on said computer system;

means recorded on said recording medium for establishing on said computer system a semaphore associated with said client process;

means recorded on said recording medium for establishing on said computer system server library means for managing the interprocess communication for said client process, said server library means including means for initializing said semaphore in such a manner that the operating system will automatically perform a specified operation on the semaphore when said client process terminates;

means recorded on said recording medium for establishing on said computer system a flag associated with said semaphore and wherein said server library code comprises means for instructing said client process to set said flag whenever said client process performs the specified operation on said semaphore;

means recorded on said recording medium for establishing on said computer system server detection means for testing the condition of said flag whenever the specified operation is performed on said semaphore in order to determine whether the specified operation was performed by said client process rather than the operating system, wherein performance of the specified operation on the semaphore by the client process is indicative of normal termination of the client process and performance of the specified operation on the semaphore by the operating system is indicative of abnormal termination of the client process; and means recorded on said recording medium for establishing on said computer system resetting means for resetting a test condition associated with said flag, said flag resetting means responsive to said server detection means.

20. The method as claimed in claim 1, further comprising the steps of:

establishing, in addition to said first semaphore, at least one additional semaphore associated with said client process for use in an initialization process; said initialization process comprising the steps of:

i) having said server process initially perform the specified operation on said first semaphore and then execute a wait function on said at least one additional semaphore;

ii) having said client process execute a wait function on said first semaphore in such a manner that said client process will initialize said first semaphore in such a manner that the operating system will automatically perform the specified operation on said first semaphore in the event said client process terminates after said server process initially performs the specified operation on said first semaphore;

iii) having said client process perform the specified operation on said at least one additional semaphore after said client process has completed step (ii).

21. The method as claimed in claim 2, further comprising the steps of:

establishing, in addition to said first semaphore, at least one additional semaphore associated with said client process for use in an initialization process, said initialization process comprising the steps of:

i) having said server process initially perform the specified operation on said first semaphore and then execute a wait function on said at least one additional semaphore;

ii) having said client process execute a wait function on said first semaphore in such a manner that said client process will initialize said first semaphore in such a manner that the operating system will automatically perform the specified operation on said first semaphore in the event said client process terminates after said server process initially performs the specified operation on said first semaphore;

iii) having said client process perform the specified operation on said at least one additional semaphore after said client process has completed step (ii).

22. The method as claimed in claim 5, further comprising the steps of:

establishing, in addition to said first semaphore, at least one additional semaphore associated with said client process for use in an initialization process, said initialization process comprising the steps of:

i) having said server process initially perform the specified operation on said first semaphore and then execute a wait function on said at least one additional semaphore;

ii) having said client process execute a wait function on said first semaphore in such a manner that said client process will initialize said first semaphore in such a manner that the operating system will automatically perform the specified operation on said first semaphore in the event said client process terminates after said server process initially performs the specified operation on said first semaphore;

iii) having said client process perform the specified operation on said at least one additional semaphore after said client process has completed step (ii).

23. The service provider as claimed in claim 8, further comprising:

means for establishing, in addition to said first semaphore, at least one additional semaphore associated with said client process for use in an initialization process;

means for instructing said server process to initially perform the specified operation on said first semaphore and then execute a wait function on said at least one additional semaphore;

means for instructing said client process to execute a wait function on said first semaphore in such a manner that said client process will initialize said first semaphore in such a manner that the operating system will automatically perform the specified operation on said first semaphore in the event said client process terminates after said server process initially performs the specified operation on said first semaphore; and means for instructing said client process to perform the specified operation on said at least one additional semaphore after said client process has initialized said first semaphore.

24. The computer program product as claimed in claim 14, further comprising means recorded on said recording medium for establishing on said computer system the following:

means for establishing, in addition to said first semaphore, at least one additional semaphore associated with said client process for use in an initialization process;

means for instructing said server process to initially perform the specified operation on said first semaphore and then execute a wait function on said at least one additional semaphore;

means for instructing said client process to execute a wait function on said first semaphore in such a manner that said client process will initialize said first semaphore in such a manner that the operating system will automatically perform the specified operation on said first semaphore in the event said client process terminates after said server process initially performs the specified operation on said first semaphore; and means for instructing said client process to perform the specified operation on said at least one additional semaphore after said client process has initialized said first semaphore.

25. The computer program product as claimed in claim 15, further comprising means recorded on said recording medium for establishing on said computer system the following:

means for establishing, in addition to said first semaphore, at least one additional semaphore associated with said client process for use in an initialization process;

means for instructing said server process to initially perform the specified operation on said first semaphore and then execute a wait function on said at least one additional semaphore;

means for instructing said client process to execute a wait function on said first semaphore in such a manner that said client process will initialize said first semaphore in such a manner that the operating system will automatically perform the specified operation on said first semaphore in the event said client process terminates after said server process initially performs the same specified operation on said first semaphore; and means for instructing said client process to perform the specified operation on said at least one additional semaphore after said client process has initialized said first semaphore.

26. The computer program product as claimed in claim 18, further comprising means recorded on said recording medium for establishing on said computer system the following:

means for establishing, in addition to said first semaphore, at least one additional semaphore associated with said client process for use in an initialization process;

means for instructing said server process to initially perform the specified operation on said first semaphore and then execute a wait function on said at least one additional semaphore;

means for instructing said client process to execute a wait function on said first semaphore in such a manner that said client process will initialize said first semaphore in such a manner that the operating system will automatically perform the specified operation on said first semaphore in the event said client process terminates after said server process initially performs the same specified operation on said first semaphore; and means for instructing said client process to perform the specified operation on said at least one additional semaphore after said client process has initialized said first semaphore.

27. The computer program product as claimed in claim 19, further comprising means recorded on said recording medium for establishing on said computer system the following:

means for establishing, in addition to said first semaphore, at least one additional semaphore associated with said client process for use in an initialization process;

means for instructing said server process to initially perform the specified operation on said first semaphore and then execute a wait function on said at least one additional semaphore;

means for instructing said client process to execute a wait function on said first semaphore in such a manner that said client process will initialize said first semaphore in such a manner that the operating system will automatically perform the specified operation on said first semaphore in the event said client process terminates after said server process initiatory performs the specified operation on said first semaphore; and means for instructing said client process to perform the specified operation on said at least one additional semaphore after said client process has initialized said first semaphore.

28. A memory for storing data for access by a program being executed on a data processing system, comprising:

a data structure stored in said memory, said data structure including information resident in a data base used by said program and including;

a plurality of data objects stored in said memory, each of said data objects containing different information from said data base;

a data object for a flag associated with a service provider program on a computer system for detecting the normal or abnormal termination of a client process running on the computer system without having to periodically poll said client process;

a data object for a semaphore associated with each client process, wherein the operating system performs a specified operation on said semaphore in the event that said client process terminates;

a data object for a flag associated with each semaphore;

a data object for instructing said client process to set each flag whenever said client process performs the specified operation on said semaphore; and a data object for testing said flag whenever the specified operation is performed on said semaphore in order to determine whether the specified operation was performed by the associated client process rather than the operating system, wherein performance of the specified operation on the semaphore by the client process is indicative of normal termination of the client process and performance of the specified operation on the semaphore by the operating system is indicative of abnormal termination of the client process.

29. A memory for storing data for access by a program being executed on a data processing system, comprising:

a data structure stored in said memory, said data structure including information resident in a data base used by said program and including;

a plurality of data objects stored in said memory, each of said data objects containing different information from said data base;

a data object for a flag associated with a service provider program on a computer system for detecting the normal or abnormal termination of a client process running on the computer system without having to periodically poll said client process, the computer system having an operating system capable of using shared memory segments for data transfer between processors running on said computer system;

a data object for a semaphore associated with each client process, wherein the operating system performs a specified operation on said semaphore in the event that said client process terminates;

a data object for a flag associated with each semaphore;

a data object for instructing said client process to set each flag whenever said client process performs the specified operation on said semaphore;

a data object for testing said flag whenever the specified operation is performed on said semaphore in order to determine whether the specified operation was performed by said client process rather than the operating system, wherein performance of the specified operation on the semaphore by the client process is indicative of normal termination of the client process and performance of the specified operation on the semaphore by the operating system is indicative of abnormal termination of the client process;

a data object for resetting the test condition if the computer system determines the flag has been set; and a data object for deallocating resources allocated to said client process if said computer system determines that the flag has not been set.

* * * * *

UNITED STATES PATENT AND TRADEMARK OFFICE
CERTIFICATE OF CORRECTION

PATENT NO. : 6,125,401  
DATED : September 26, 2000  
INVENTOR(S) : Matthew A. Huras and Tim J. Vincent Page 1 of 1

It is certified that error appears in the above-identified patent and that said Letters Patent is hereby corrected as shown below:

Title page,  
Item [56] References Cited, OTHER PUBLICATIONS,  
Ruddle, Kevin: "05-2" should read -- OS-2 --.

Column 11,  
Line 6, "stem" should read -- system --.

Column 14,  
Line 55, "processing" should read -- process running --.

Column 17,  
Line 22, before "specified" insert -- same --.

Signed and Sealed this

Second Day of April, 2002

Attest:

JAMES E. ROGAN  
Attesting Officer  
Director of the United States Patent and Trademark Office